(No Model.)  2 Sheets—Sheet 1.

J. T. McNORTON.
Plow Carriage.

No. 235,692.  Patented Dec. 21, 1880.

Witnesses
Nat. E. Oliphant.
Geo. R. Porter.

Inventor
John T. McNorton,
per Chas. H. Fowler.
Attorney (No Model.) 2 Sheets—Sheet 2.

J. T. McNORTON.
Plow Carriage.

No. 235,692. Patented Dec. 21, 1880.

Witnesses
Nat. E. Oliphant
Geo. B. Porter

Inventor
John T. McNorton,
per Chas. H. Fowler
Attorney.

UNITED STATES PATENT OFFICE.

JOHN T. McNORTON, OF FLORENCE, TEXAS.

PLOW-CARRIAGE.

SPECIFICATION forming part of Letters Patent No. 235,692, dated December 21, 1880.

Application filed May 31, 1880. (No model.)

*To all whom it may concern:*

Be it known that I, JOHN T. MCNORTON, a citizen of the United States, residing at Florence, in the county of Williamson and State of Texas, have invented certain new and useful Improvements in Plow-Carriages; and I do hereby declare that the following is a full, clear, and exact description of the same, reference being had to the annexed drawings, making a part of this specification, and to the letters and figures of reference marked thereon.

Figure 1:
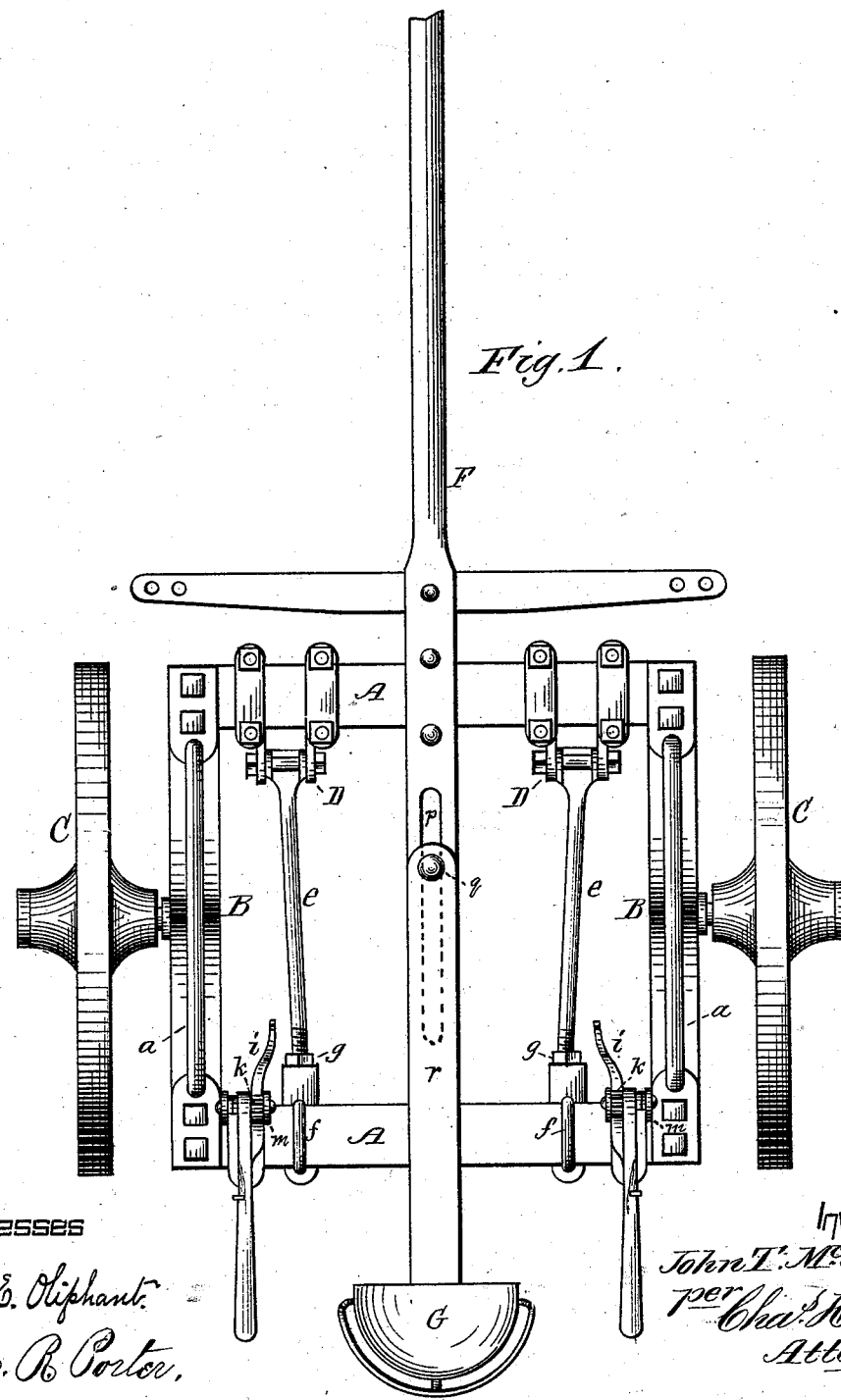
Figure 2:
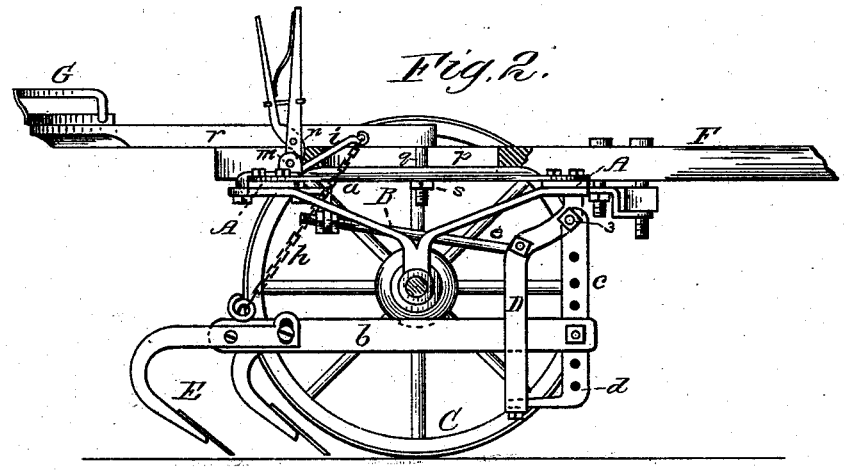
Figure 3:
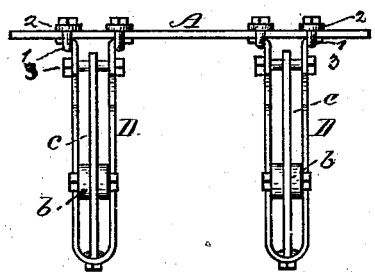
Figure 4:
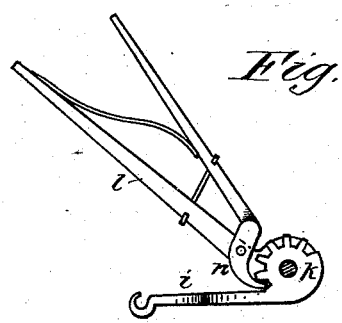

Figure 1 is a top-plan view of my invention. Fig. 2 is a side elevation of the same, partly in section. Fig. 3 is a detailed view of the keepers for the plow-beams; and Fig. 4 is a similar view of the lever, pawl, and ratchet-arm for elevating and lowering the plows.

The present invention has relation to certain new and valuable improvements in plow-carriages, as illustrated in the drawings, hereinafter described, and subsequently pointed out in the claims.

In the accompanying drawings, A represents the cross-beams forming a part of the frame of the carriage, to which are bolted the braces $a$. To the ends of the cross-beams A are secured the bifurcated arms B of the axles in such a manner that they may be adjusted upon the cross-beams, whereby the distance between the wheels C may be increased or diminished at pleasure, so as to accommodate the carriage to the use of one or two plows, as circumstances may require, and thus also secure a diminution of the draft when found practicable.

The keepers D are removably connected to the cross-beams A by means of screw-bolts 1, having an eye in their lower ends, into which the bent upper ends of the keepers are inserted, said keepers being clamped and held firmly against the under side of the cross-beams by means of a nut, 2. The keepers D and the uprights $c$ are secured together at their upper ends by bolts 3. This arrangement, it will be observed, while insuring the maintenance of the plow-beams $b$ in a right line and preventing the plow swinging laterally, provides a ready means of adjustment for the keepers transversely of the frame when it is desired to change the position of the plows by bringing them closer together or removing them farther apart.

The keepers D, through which the ends of the plow-beams pass, are provided with uprights $c$, each of which has a series of holes, $d$, so that the ends of the plow-beams can be elevated or lowered at any desired angle above or below a horizontal position, thus setting the plow E to run to a greater or less depth in the ground, as may be desired, and steadily maintaining it in that angle or position.

The keepers D are braced by rods $e$, connected thereto and to the rear cross-beam of the carriage by yokes $f$, the ends of the rods being screw-threaded to receive nuts $g$, which hold the rods to said yokes and admit of the rods being properly adjusted with relation to the distance between the cross-beams A.

The plow-beams $b$ are connected by suitable cords or chains $h$ to arms $i$, said arms having ratchet-wheels $k$. The ratchet-wheels, with their arms and also levers $l$, are journaled to clips $m$, the latter being detachably connected to the rear one of the cross-beams A, and the levers have pivoted to them pawls $n$, to act upon the teeth of the ratchet-wheels $k$. By this arrangement the plows can be elevated entirely above the surface of the ground and retained in such position, and lowered when desired to bring the plows in position for working. The depth at which the plows run into the ground may be also regulated, the adjustment of the height of the plows in either case being effected by the driver without the necessity of dismounting from his seat, as the lever is in convenient reach.

The tongue F is also connected to the cross-beams A, so that it may be removed or its position changed thereon, and has in that part located between the cross-beams an elongated opening, $p$, to receive a bolt, $q$, passing through the front end of a support, $r$, said support having secured thereto the seat G for the driver.

The position of the driver's seat can be changed with relation to the plow-carriage at its rear end by simply securing the rod $q$ by a screw-nut, $s$, at the desired position in the elongated opening $p$.

The several parts of the carriage may be constructed of any desirable material; but it is preferred that the cross-beams A, bifurcated arms B, the keepers D, and the devices for raising or lowering the plows be constructed of wrought metal, thereby producing a plow-carriage of great strength and durability at a comparatively small cost, and also possessing simplicity in construction, as well as being practical and effective in its purpose.

Having now fully described my invention, what I claim as new, and desire to secure by Letters Patent, is—

1. The combination, in a plow-carriage, of the bifurcated arms B, adjustably secured at their upper ends to the under side of the cross-beams A, with capability of movement therealong, by screw-bolts, their lower ends being secured to the wheel-axles, as described, and the adjustable braces $a$, substantially as set forth.

2. The combination, in a plow-carriage, of the keepers D, having outwardly-turned upper ends, and means for securing the vertical, transverse, and longitudinal adjustment of said keepers, consisting of screw-eyebolts 1 and nuts 2, securing said keepers to the under side of the cross-beams, uprights $c$, bolts 3, securing said keepers and uprights together, screw-threaded rods $e$, bracing the keepers and secured to the rear cross-beam, and yokes $f$, substantially as set forth.

In testimony that I claim the above I have hereunto subscribed my name in the presence of two witnesses.

JOHN TOMAS McNORTON.

Witnesses:
A. G. WALKER,
J. J. FINNEY.